(12) United States Patent
Kapels

(10) Patent No.: US 8,157,288 B2
(45) Date of Patent: Apr. 17, 2012

(54) TRAILER WITH DETACHABLE CARGO CARRIER

(76) Inventor: Cory S. Kapels, Columbus, NE (US)

( * ) Notice: Subject to any disclaimer, the term of this patent is extended or adjusted under 35 U.S.C. 154(b) by 205 days.

(21) Appl. No.: 12/799,649

(22) Filed: Apr. 29, 2010

(65) Prior Publication Data

US 2011/0266776 A1 Nov. 3, 2011

(51) Int. Cl.
*B62D 53/00* (2006.01)
(52) U.S. Cl. .................. 280/656; 280/416.1; 280/491.1
(58) Field of Classification Search .................. 280/401, 280/656, 491.1, 639, 408, 416.1
See application file for complete search history.

(56) References Cited

U.S. PATENT DOCUMENTS

| | | | | |
|---|---|---|---|---|
| 2,229,258 A * | 1/1941 | Ronk | ........................ | 105/215.2 |
| 3,070,386 A * | 12/1962 | Gregg | ........................... | 280/404 |
| 3,151,880 A * | 10/1964 | Black | ........................... | 280/408 |
| 3,208,768 A * | 9/1965 | Hulbert | ........................ | 280/408 |
| 3,612,600 A * | 10/1971 | Salichs | ........................ | 296/181.7 |
| 4,239,258 A * | 12/1980 | Burris | ........................ | 280/639 |
| 4,480,851 A * | 11/1984 | St-Pierre | ........................ | 280/656 |
| 4,772,038 A * | 9/1988 | MacDonald | ................ | 280/401 |
| 4,786,073 A * | 11/1988 | Harper | ........................ | 280/656 |
| 4,906,041 A * | 3/1990 | McKenzie | ..................... | 296/61 |
| 5,090,719 A * | 2/1992 | Hanaoka | ...................... | 280/408 |
| 5,249,821 A * | 10/1993 | Ricketts et al. | .............. | 280/638 |
| 5,354,090 A | 10/1994 | Grovom | | |
| 5,480,180 A * | 1/1996 | Fuller et al. | .................... | 280/656 |
| 5,494,309 A * | 2/1996 | Roy | .............................. | 280/401 |
| 5,570,898 A * | 11/1996 | Albert | .......................... | 280/656 |
| 6,254,117 B1 * | 7/2001 | Cross | .............................. | 280/401 |
| 6,378,893 B1 * | 4/2002 | Jager | .............................. | 280/656 |
| 6,550,794 B1 * | 4/2003 | Spindel et al. | ............. | 280/79.11 |
| 6,846,003 B2 * | 1/2005 | Thompson | ................... | 280/656 |
| 7,156,273 B2 | 1/2007 | Morris | | |
| 7,374,197 B2 * | 5/2008 | Leverett | ........................ | 280/656 |
| 7,455,312 B2 * | 11/2008 | Senatore | ................... | 280/491.1 |
| 7,891,697 B1 * | 2/2011 | Fahrbach | ..................... | 280/656 |
| 7,997,605 B2 * | 8/2011 | Kittrell | .......................... | 280/400 |
| 7,997,607 B2 * | 8/2011 | Voves | .......................... | 280/408 |
| 2002/0195798 A1 * | 12/2002 | James | .......................... | 280/656 |
| 2003/0102655 A1 * | 6/2003 | Thompson | ................... | 280/656 |
| 2004/0239073 A1 * | 12/2004 | Goettker | ................... | 280/491.1 |
| 2005/0046167 A1 * | 3/2005 | Lin | .................................. | 280/785 |
| 2005/0104324 A1 * | 5/2005 | Richard et al. | ............. | 280/491.1 |
| 2007/0001432 A1 * | 1/2007 | Thurm | .......................... | 280/656 |
| 2008/0157493 A1 * | 7/2008 | McConkey et al. | ............ | 280/40 |
| 2008/0231017 A1 * | 9/2008 | Voves | .......................... | 280/408 |
| 2009/0001756 A1 | 1/2009 | Dempsey et al. | | |
| 2009/0134605 A1 * | 5/2009 | Norton | .......................... | 280/656 |
| 2009/0309330 A1 | 12/2009 | Ryan | | |

* cited by examiner

*Primary Examiner* — J. Allen Shriver, II
*Assistant Examiner* — Erez Gurari
(74) *Attorney, Agent, or Firm* — Dennis L. Thomte; Thomte Patent Law Office LLC

(57) ABSTRACT

A trailer including a cargo carrier is provided. The cargo carrier may be secured to the rear of the trailer to increase the carrying capacity of the trailer. The cargo carrier may also be used independently of the trailer. The trailer may be positioned in a vertically disposed position for transport or storage.

16 Claims, 9 Drawing Sheets

TRAILER WITH DETACHABLE CARGO CARRIER

BACKGROUND OF THE INVENTION

1. Field of the Invention

This invention relates to a trailer adapted to be hitched to the rearward end of a vehicle and more particularly to a trailer including a detachable cargo carrier which may be selectively removably secured to the rear of the trailer to increase the carrying capacity of the trailer or which may be selectively removably secured to the box receiver at the rear end of the vehicle when the vehicle is not being used to tow the trailer. Even more particularly, this invention relates to a trailer of the type described which may be secured to the rearward end of a vehicle in a substantially vertically disposed position when the trailer is not being used to transport cargo. Even more particularly, this invention relates to a trailer of the type described wherein the cargo carrier may be selectively removably secured to the trailer when the trailer is in its substantially vertically disposed transport position. The trailer may also be stored in a garage or the like in a vertically disposed position with the cargo carrier being secured to the underside of the trailer.

2. Description of the Related Art

Many types of trailers have been previously provided with the trailer being towed by a vehicle. Usually, the vehicle has a box receiver at the rearward end thereof into which is received a tow bar or hitch bar with the hitch bar having either a clevis or hitch ball secured to the rearward end so that the trailer may be hitched thereto. There are many times when the conventional trailer being towed by a vehicle is too small for a particular load. Further, there are many times when the trailer is towed by the vehicle without the trailer having any cargo positioned thereon. Many residential areas prohibit the storage of trailers outside of a garage or the like. When the trailer is stored in a garage or the like, it takes up considerable space.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer is disclosed for use with a vehicle having a forward end, a rearward end and a longitudinally extending first box receiver at the rearward end thereof which has an open rearward end. The trailer has a frame means with a forward end, a rearward end with a bed positioned thereon. The trailer includes a transversely extending axle secured to the frame means with first and second wheels secured thereto. The trailer bed includes a forward end, a rearward end, a first end and a second end.

A second longitudinally extending box receiver is secured to the frame means of the trailer at the forward end thereof with the box receiver having an open forward end. A third longitudinally extending box receiver is secured to the trailer at the rearward end thereof which has an open rearward end. The invention also includes a first elongated hitch bar having forward and rearward ends with the rearward end of the first hitch bar being selectively removably secured by the second box receiver. A coupler is selectively removably secured to the forward end of the first hitch bar which is adapted to be secured to a ball hitch secured to the first box receiver of the vehicle to enable the vehicle to tow the trailer.

The invention also includes a cargo carrier including a bed having a forward end, a rearward end, a first side and a second side. The cargo carrier has a longitudinally extending second hitch bar secured thereto at its forward end which may be selectively removably received by the first box receiver of the vehicle when the trailer is disconnected from the vehicle or selectively removably received by the third box receiver, when the trailer is connected to the vehicle so that the bed of the cargo carrier forms a rearwardly extending extension of the trailer bed to increase the carrying capacity of the trailer. The rearward end of the trailer may be pivotally secured to the first box receiver of the vehicle so that the trailer may be moved from its normally horizontally disposed trailing position to a substantially vertically disposed transport position at the rear of the vehicle. The cargo carrier may be selectively removably secured to the trailer when the trailer is in its substantially vertically disposed transport position.

The trailer, when not being used, may be conveniently stored in a vertically disposed position in a garage adjacent a wall or the like with the cargo carrier being secured thereto.

It is therefore a principal object of the invention to provide an improved trailer.

A further object of the invention is to provide a trailer having a cargo carrier selectively removably secured thereto to increase the carrying capacity of the trailer or which may be selectively removably secured to the box receiver of a vehicle when the trailer is not being towed.

A further object of the invention is to provide a trailer of the type described which may be positioned in a vertically disposed transport position at the rear of a vehicle.

A further object of the invention is to provide a trailer which may be stowed in a substantially vertically disposed position in a garage or the like thereby occupying a small amount of space.

A further object of the invention is to provide a trailer of the type described which may be stored in a generally vertically disposed condition with a support means being provided to prevent the trailer from tipping over while it is being stored.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
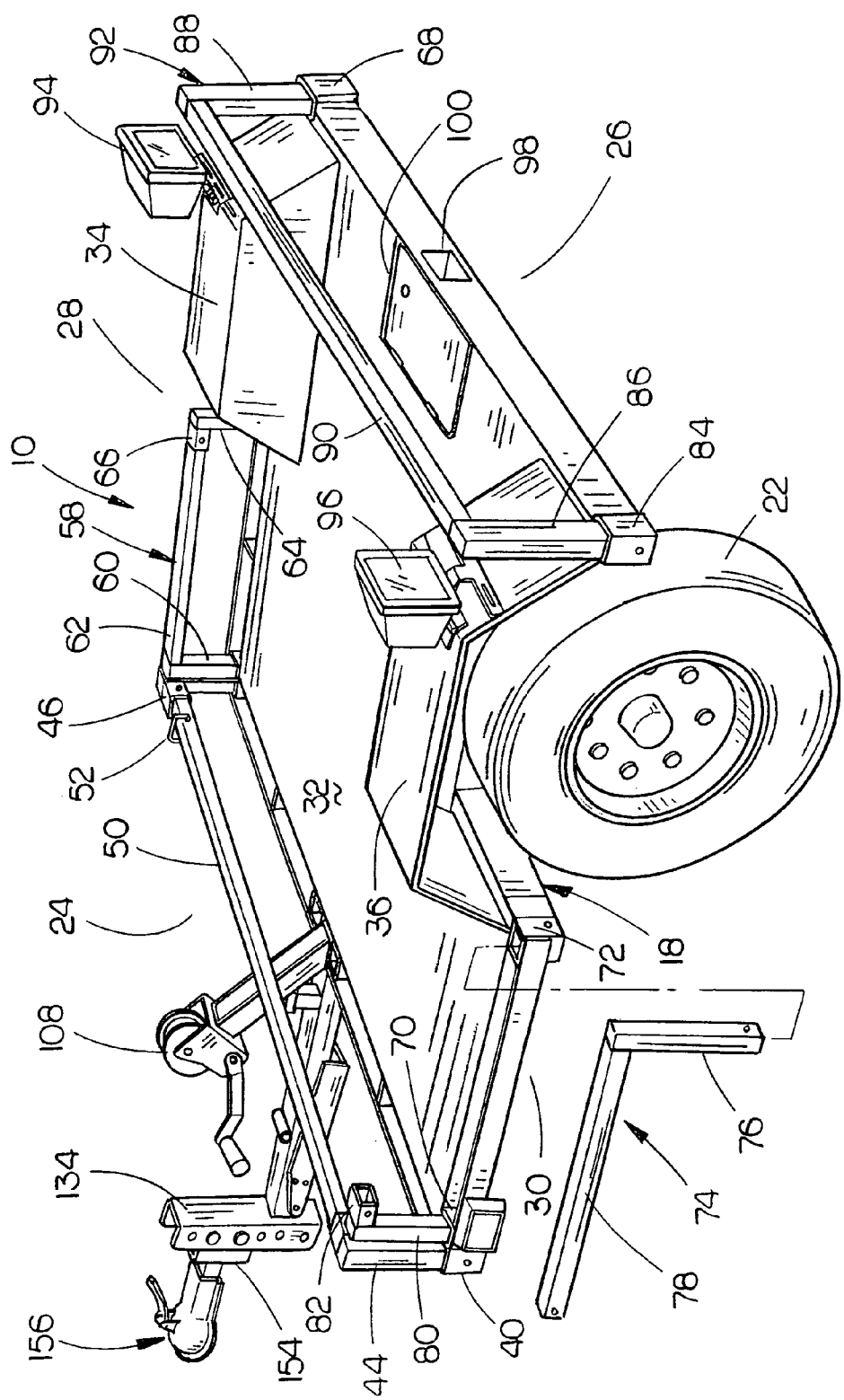
FIG. 1 is a rear perspective view of the trailer of this invention with one of the side rails being illustrated as being removed from the trailer.
Figure 2:
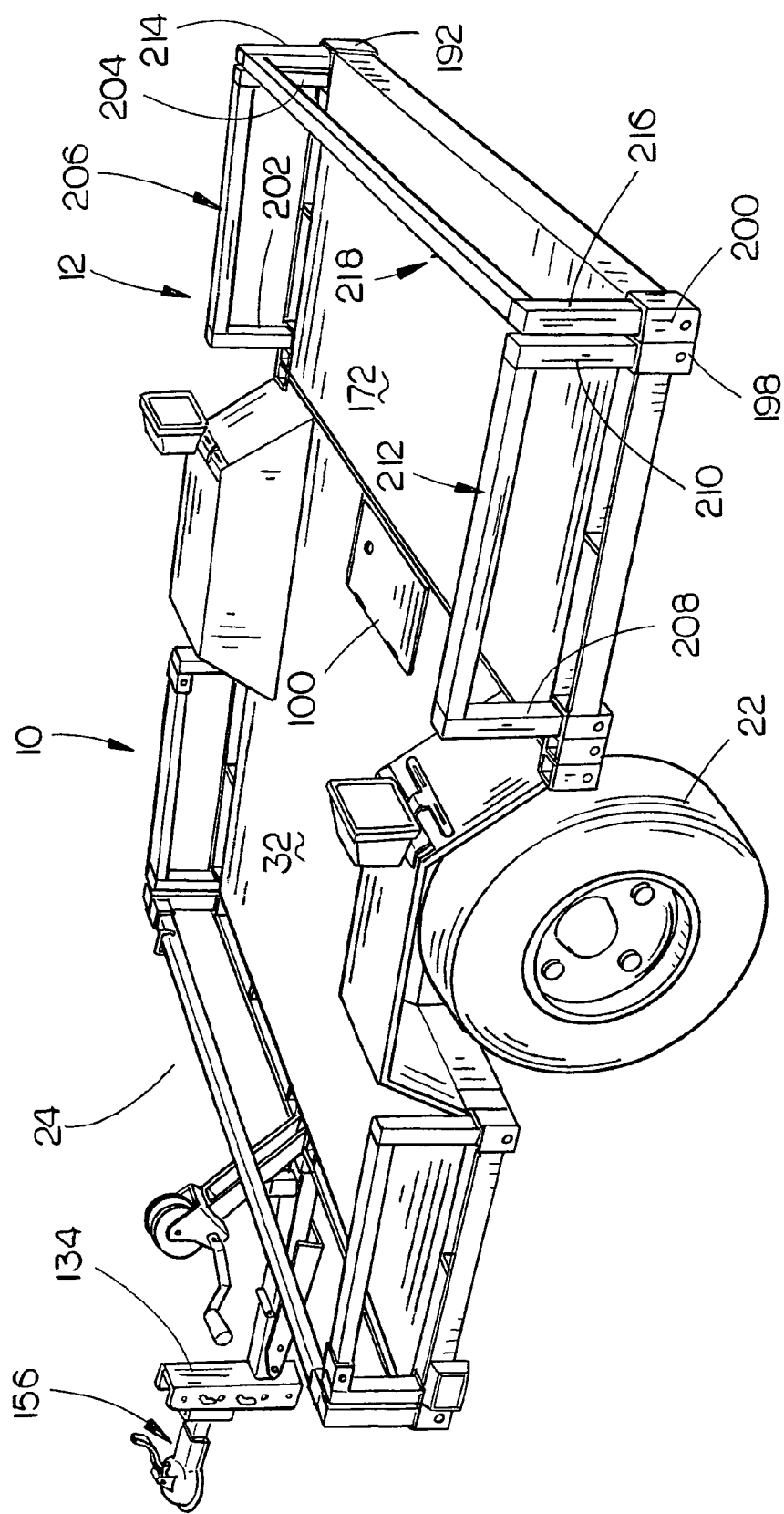
FIG. 2 is a rear perspective view of the trailer having the cargo carrier portion of the invention secured to the rear of the trailer to increase the carrying capacity thereof.
Figure 3:
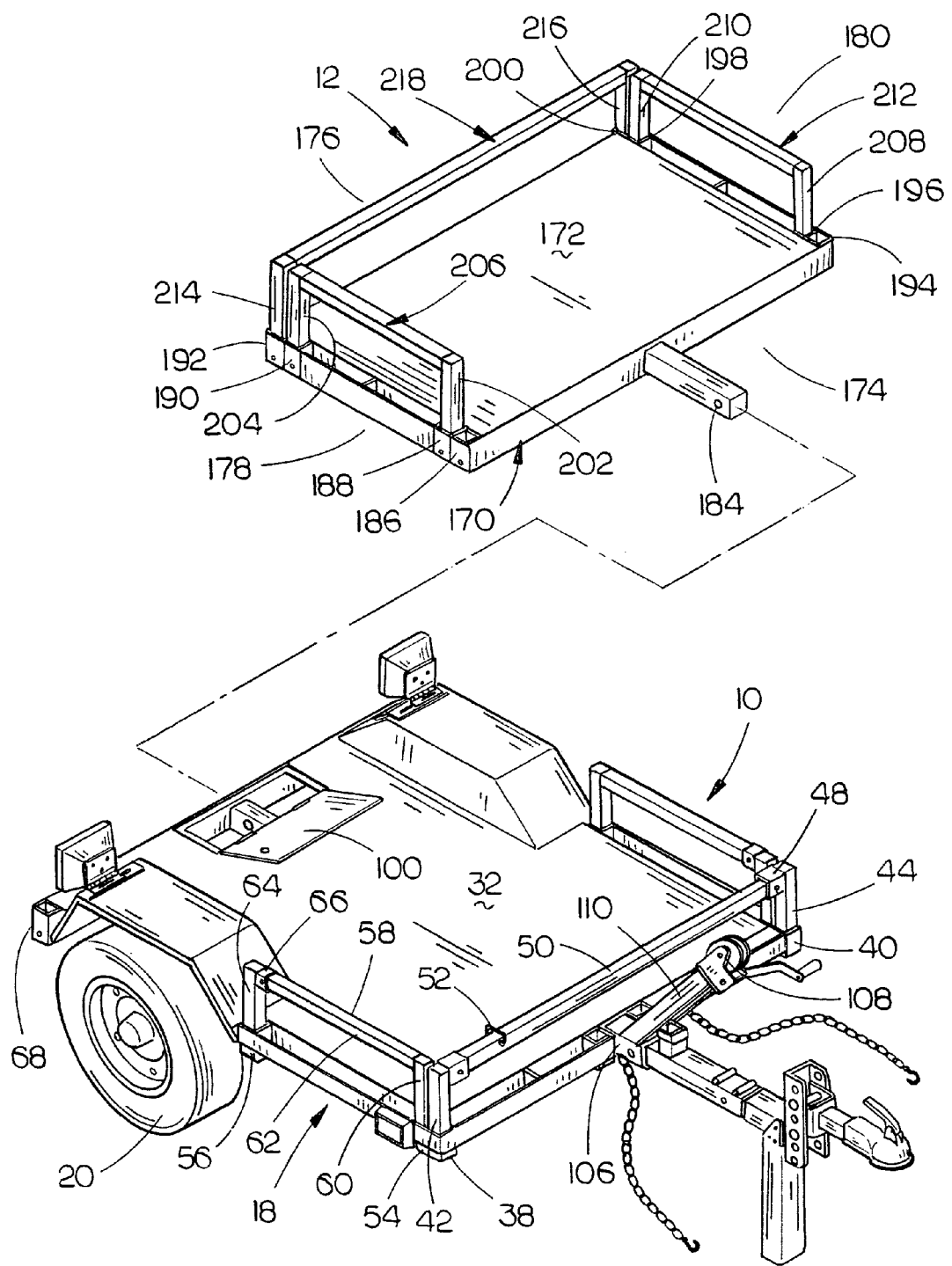
FIG. 3 is an exploded perspective view of the trailer and cargo carrier.

The basic trailer of this invention is shown in FIGS. 1-3 and is designated by the reference numeral 10. The numeral 12 refers to a cargo carrier which may be either positioned at the rear of the trailer to increase the length of the trailer or which may be used separately as will be described in more detail hereinafter. The numeral 14 refers to a vehicle having a conventional hitch box receiver 16 at the rearward end thereof.

Trailer 10 includes a wheeled frame means 18 including a right wheel 20 and a left wheel 22 mounted on an axle of conventional design. For purposes of description, trailer 10 will be described as having a forward end 24, a rearward end 26, a right side 28 and a left side 30. Trailer 10 includes a deck or bed 32 and fenders 34 and 36. The forward end of trailer 10 has a pair of corner pockets 38 and 40 secured thereto which are adapted to vertically removably receive vertical posts 42 and 44 therein respectively. The upper inner ends of posts 42 and 44 have horizontally disposed pockets 46 and 48 secured thereto which selectively removably receive the ends of the post 50. The ends of post 50 are maintained in pockets 46 and 48 by detents or the like. Post 50 is provided with a bracket 52 adjacent one end thereof (FIG. 3).

The right side of the trailer 10 is provided with a pair of horizontally spaced-apart and vertically disposed pockets 54 and 56 (FIG. 3). The numeral 58 refers to an L-shaped member 58 including legs 60 and 62. Leg 60 is adapted to be received in pocket 54 as seen in FIG. 3. Post 64 is removably positioned in pocket 56 and has a horizontally disposed pocket 66 at its upper end which is adapted to removably receive the free end of leg 62 of member 58. The right side of trailer 10 also has a vertically disposed pocket 68 provided at the rearward end thereof as seen in FIGS. 1 and 3. Pockets 54, 56, 66 and 68 include conventional detents.

The left side of the trailer 10 is provided with a pair of horizontally spaced-apart and vertically disposed pockets 70 and 72 (FIG. 1). The numeral 74 refers to an L-shaped member including legs 76 and 78. Leg 76 is adapted to be received in pocket 72 as seen in FIG. 1. Post 80 is removably positioned in pocket 70 and has a horizontally disposed pocket 82 at its upper end which is adapted to removably receive the free end of leg 78 of member 74. The left side of trailer 10 also has a vertically disposed pocket 84 provided at the rearward end thereof as seen in FIG. 1. Posts 86 and 88 extend between tube 90 of member 92 and are selectively removably received in pockets 84 and 68 respectively. Pockets 70, 72, 82 and 84 include conventional detents.

Fenders 34 and 36 have laterally adjustable lights 94 and 96 mounted thereon. A hitch box receiver 98 extends forwardly into the rearward end of trailer 10 (FIG. 1) and is secured to the frame means 18 by welding or the like.

Figure 5:
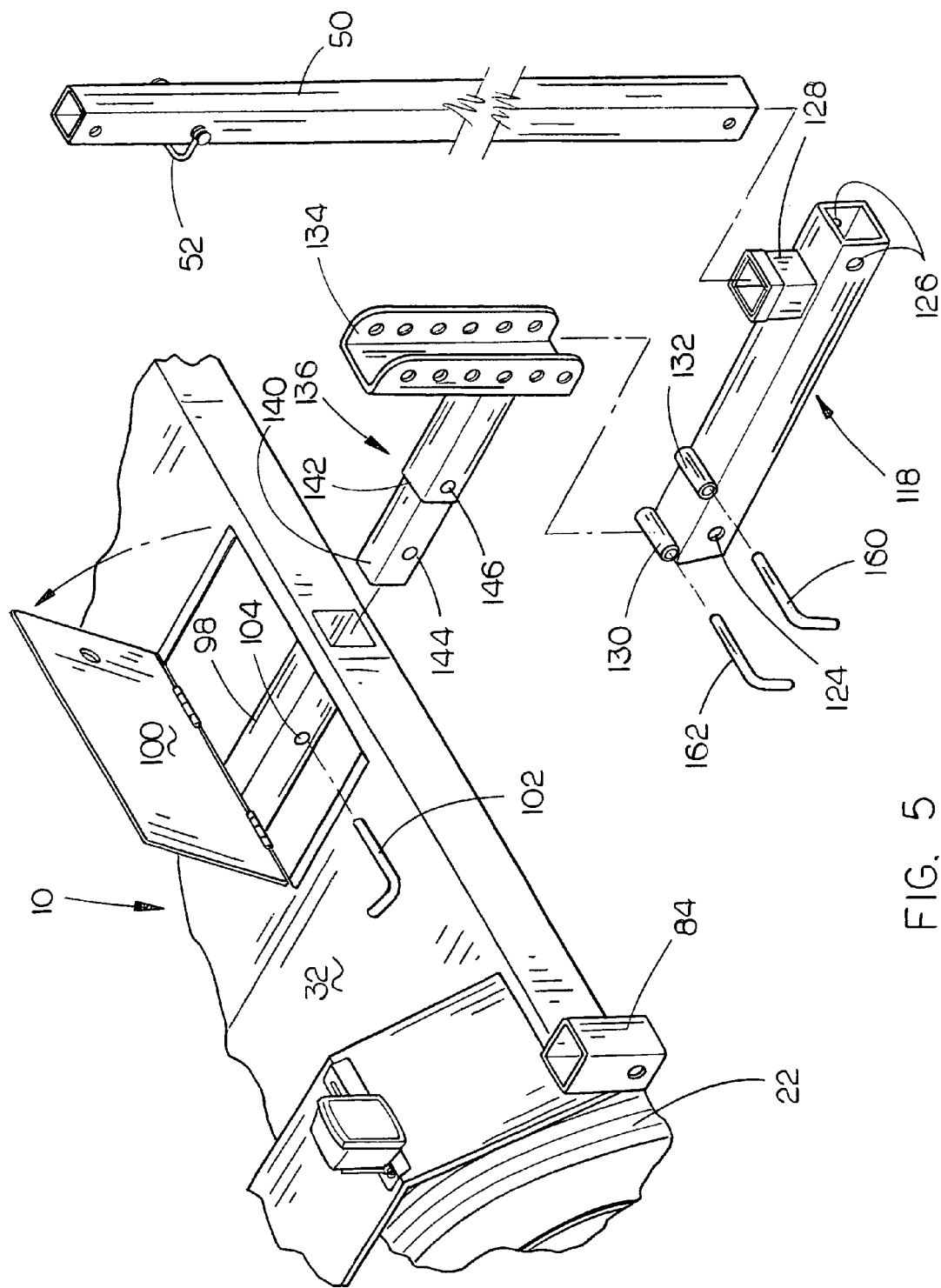
FIG. 5 is a partial exploded perspective view illustrating a portion of the structure of FIG. 4 being used at the rear end of the trailer to enable the trailer to be moved to a vertically disposed position at the rear of the vehicle.

An access cover 100 is hingedly secured to deck 32 at the rearward end thereof to provide access to the hitch box receiver 98 to permit a person to insert a retainer pin 102 into the opening 104 in the hitch box receiver 98 (FIG. 5).

A hitch box receiver 106 extends rearwardly into the forward end of trailer 10 and is secured to the frame means 18 by welding or the like. Winch 108 is mounted on the upper end of a winch support 110, the lower end of which is welded or otherwise secured to the frame means 18 or the hitch box receiver 106. Winch 108 includes a cable 112 extending therefrom. The forward end of hitch box receiver 106 has a pair of openings 114 formed in the side walls thereof adapted to receive a retaining pin.

Figure 4:
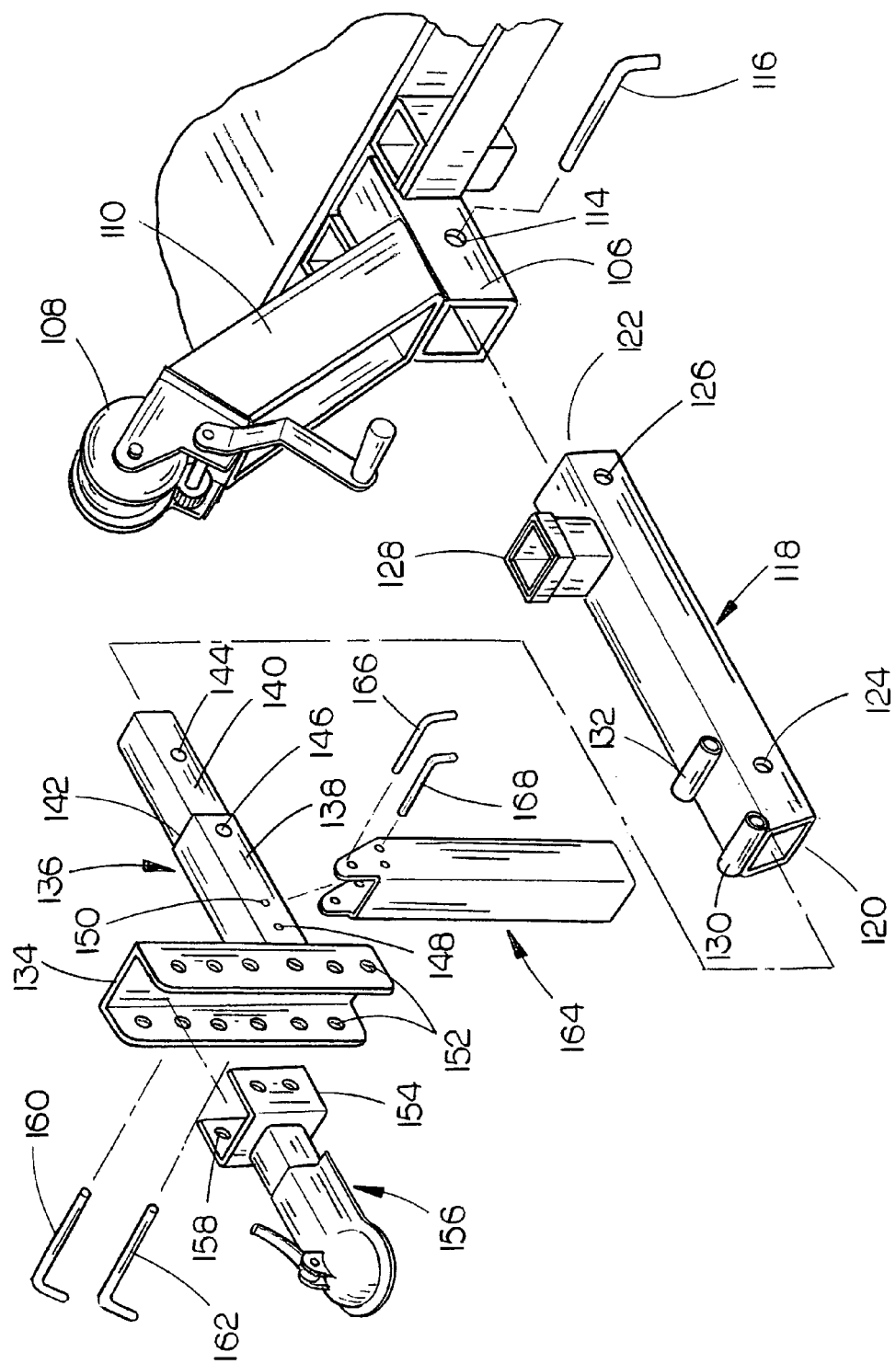
FIG. 4 is a partial exploded perspective view illustrating the structure at the forward end of the trailer.

The numeral 118 refers to an elongated hollow tube or hitch member having a forward end 120 and a rearward end 122. A pair of openings 124 are formed in the side walls of tube 118 adjacent the forward end thereof and a pair of openings 126 are formed in the side walls of tube 118 adjacent the rearward end thereof as seen in FIG. 4. A vertically disposed pocket or tubular member 128 is welded to tube 118 adjacent the rearward end thereof. A pair of transversely extending and horizontally spaced-apart pivot tubes 130 and 132 are welded to the upper surface of tube 118 (FIG. 4).

As seen in FIG. 4, a vertically disposed channel member 134 has a tube or bar 136 extending transversely therefrom which is welded thereto. Tube 136 is comprised of tube portions 138 and 140. Tube portion 140 is slightly smaller than tube portion 138 to define a shoulder 142 therebetween. Tube portion 140 has an opening 144 formed therein with tube portion having an opening 146. Tube portion 138 also has a pair of smaller openings 148 and 150 formed therein. Each of the sides of channel member 134 has a plurality of vertically spaced-apart openings 152 formed therein to permit the channel member 154 of trailer coupler 156 to be selectively vertically adjustably secured to tube 136. As seen, the sides of channel member 154 have vertically spaced openings 158 formed therein. Pins 160 and 162 are utilized to adjustably secure coupler 156 to channel member 134.

A stand 164 is selectively pivotally secured to tube portion 138 by pins 166 and 168 to enable the stand 164 to be vertically disposed to support the forward end of the trailer 10 when coupler 156 is disconnected from the vehicle hitch. Stand 164 may also be selectively pivoted to a substantially horizontal position and pinned in that position for transport.

Cargo carrier 12 includes a frame means 170 having a deck or bed 172 positioned thereon. The cargo carrier includes a forward end 174, a rearward end 176, a right side 178, and a left side 180. A tubular hitch bar 182 is secured to the frame means 170 and extends forwardly therefrom. As seen, hitch bar 182 has an opening 184 formed therein adjacent the forward end thereof. The right side of cargo carrier 12 has vertically disposed pockets 186, 188, 190 and 192 provided thereon. The left side of cargo carrier 12 has vertically disposed pockets 194, 196, 198 and 200 provided thereon. The lower ends of the vertically disposed posts 202 and 204 of member 206 are selectively removably received in pockets 188 and 190 respectively. The lower ends of the vertically disposed posts 208 and 210 of member 212 are selectively removably received in pockets 196 and 198 respectively. The lower ends of the vertically disposed posts 214 and 216 of member 218 are selectively removably received in pockets 192 and 200 respectively. Pockets 186, 188, 190, 102, 194, 196, 198 and 200 include conventional detents. As will be described in more detail later, hitch bar 182 may be inserted into the box receiver 16 of the vehicle 14 or inserted into the two spaced-apart pockets 220 and 222 which are secured to the underside of the trailer 10.

FIG. 1 illustrates the trailer in its towing position with the coupler 156 at the front of the trailer being adapted to be received by a ball hitch at the rear of the vehicle. FIG. 1 also illustrates that the member 74 may be selectively removed from the pockets 72 and 82 so it will be able to serve as a stand as will be later described. The same is also true of member 58. When it is desired to increase the carrying capacity of the trailer 10, the railing or rack 90 at the rear of the trailer is removed from the pockets 84 and 68 and the cargo carrier 12 is secured to the trailer by inserting the hitch bar 182 into the box receiver 98 at the rear of the trailer. When the cargo carrier is installed or secured to the trailer 10 as illustrated in FIG. 2, the carrying capacity of the trailer is dramatically increased.

The cargo carrier 12 may also be used independently of the trailer 10 with the hitch bar 182 being received by the box receiver 16 of the vehicle. In its normal use, as seen in FIG. 4, the rearward end 122 of the hitch bar 118 will be inserted into the forward end of the box receiver 106 with the pin 116 securing the same. As seen in FIG. 4, the hitch bar portion 140 is received by the forward end of the tube 118. The coupler 156 may be vertically adjustably secured to the channel member 134 by the pins 160 and 162. The channel member or stand 164 may be pivotally moved to its horizontally disposed position and pinned in that position by the pins 166 and 168. If the stand 164 is going to be used to support the forward end of the trailer, the stand 164 will be pivotally moved to its vertically disposed position and pinned into that position by the pins 166 and 168.

Figure 6:
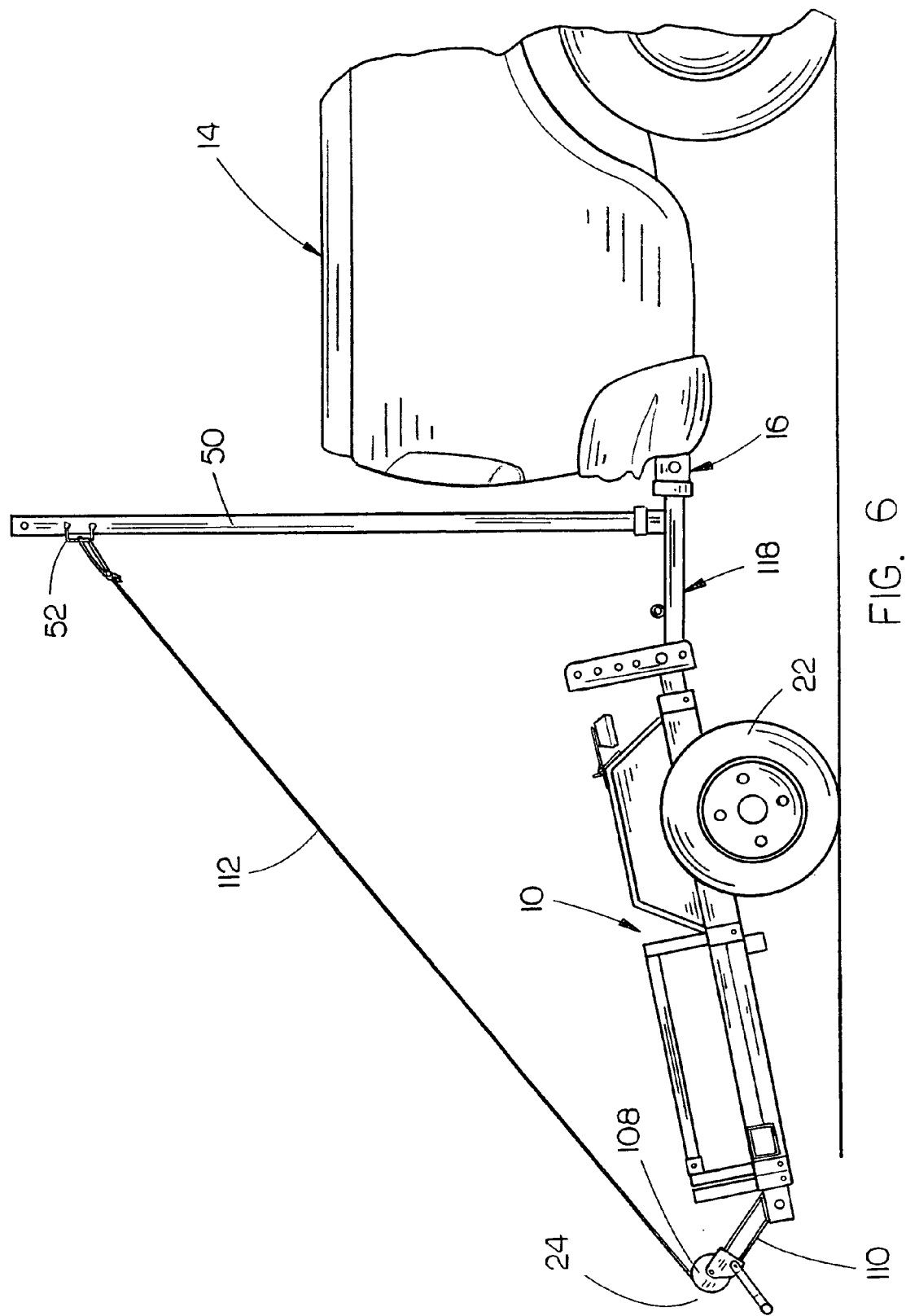
FIG. 6 is side view illustrating the manner in which the rear end of the trailer may be connected to the rear of the vehicle.

When it is desired to transport the trailer without the trailer being used for cargo, the tube 118 will be removed from box receiver 106, and the tube portion 140 will be removed from the forward end of the tube 118. The trailer 10 is then moved so that its rearward end is positioned adjacent the rear of the vehicle. The tube portion 140 of the tube 136 is then inserted into the box receiver 98 as illustrated in FIG. 5. The cover or door 100 is then raised to gain access to the opening 104 so that the pin 102 may be used to secure the tube 136 in the box receiver 98. The rearward end of tube 118 will then be inserted into the box receiver 16 at the rear of the vehicle and pinned thereto. The trailer 10 is then maneuvered so that the lowermost pair of openings 152 in the channel member 134 are positioned at opposite sides of the pivot tube 130 with the pin 162 then being inserted through the sides of the channel member 134 and the pivot tube 130. The bar 50 is then removed from the front rack or railing of the trailer with the lower end thereof being inserted into the pocket 128. The winch cable 112 is then unreeled from the winch 108 and secured to the bracket or clip 52 on post 50. The winch 108 is then operated to move the trailer from the position of FIG. 6 to the position of FIG. 7. When the trailer is in the position of FIG. 7, the channel member 134 embraces the tube 118 and the pin 160 is then inserted through registering openings of the channel member 134 and the pivot tube 132. It is recommended that chains, such as illustrated in the drawings, be used to secure the trailer in the position illustrated in FIG. 8. When the trailer is in the position of FIG. 7, the cargo carrier 12 is secured to the pockets 220 and 222 by inserting the hitch bar 182 downwardly through the pockets 220 and 222 and a pin then being inserted through the hitch bar 182 to maintain the hitch bar in that position.

Figure 7:
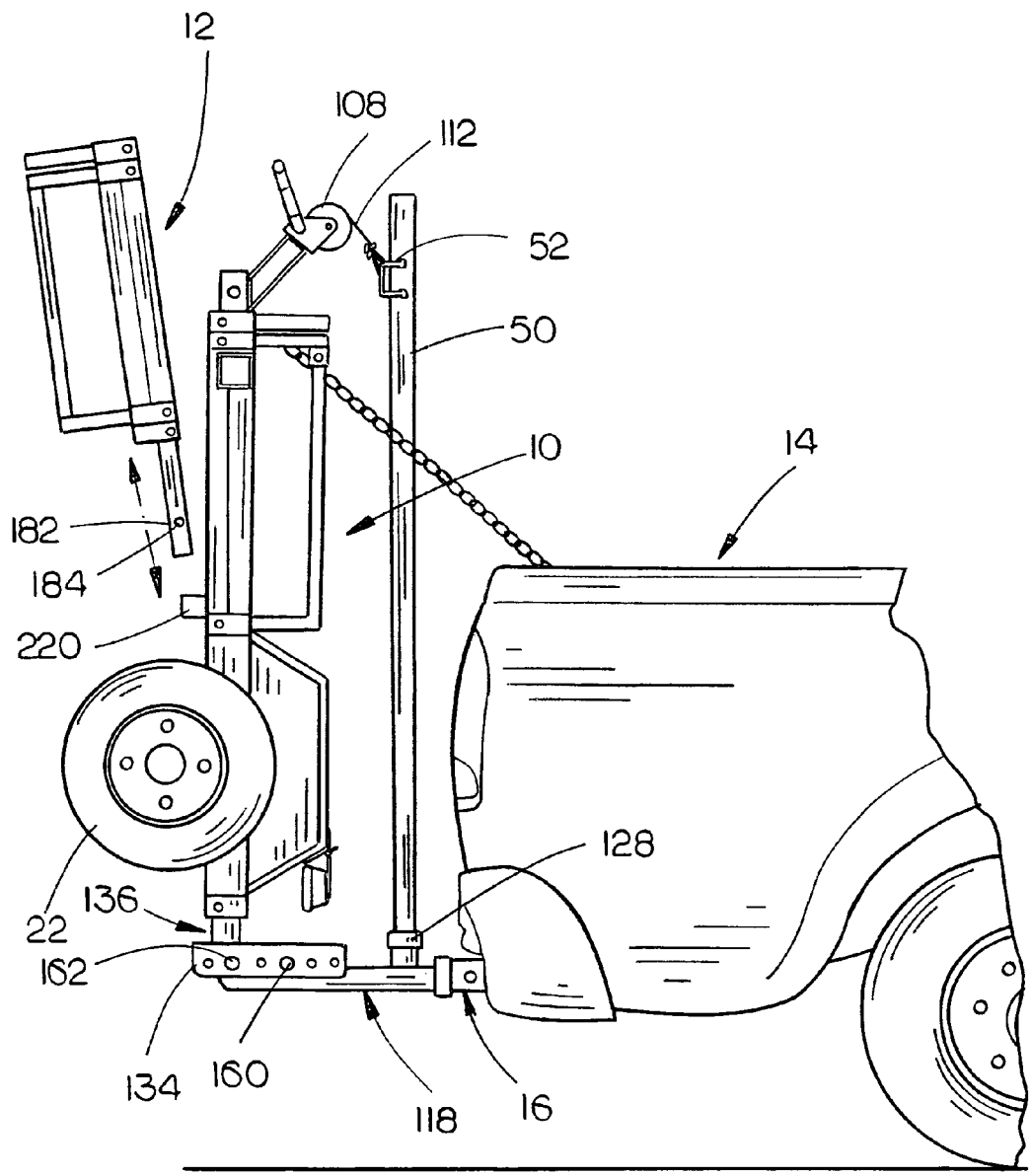
FIG. 7 is a view similar to FIG. 6 except that the trailer has been raised to its vertically disposed position at the rear of the vehicle with the view illustrating the cargo carrier being positioned at the underside of the trailer.
Figure 8:
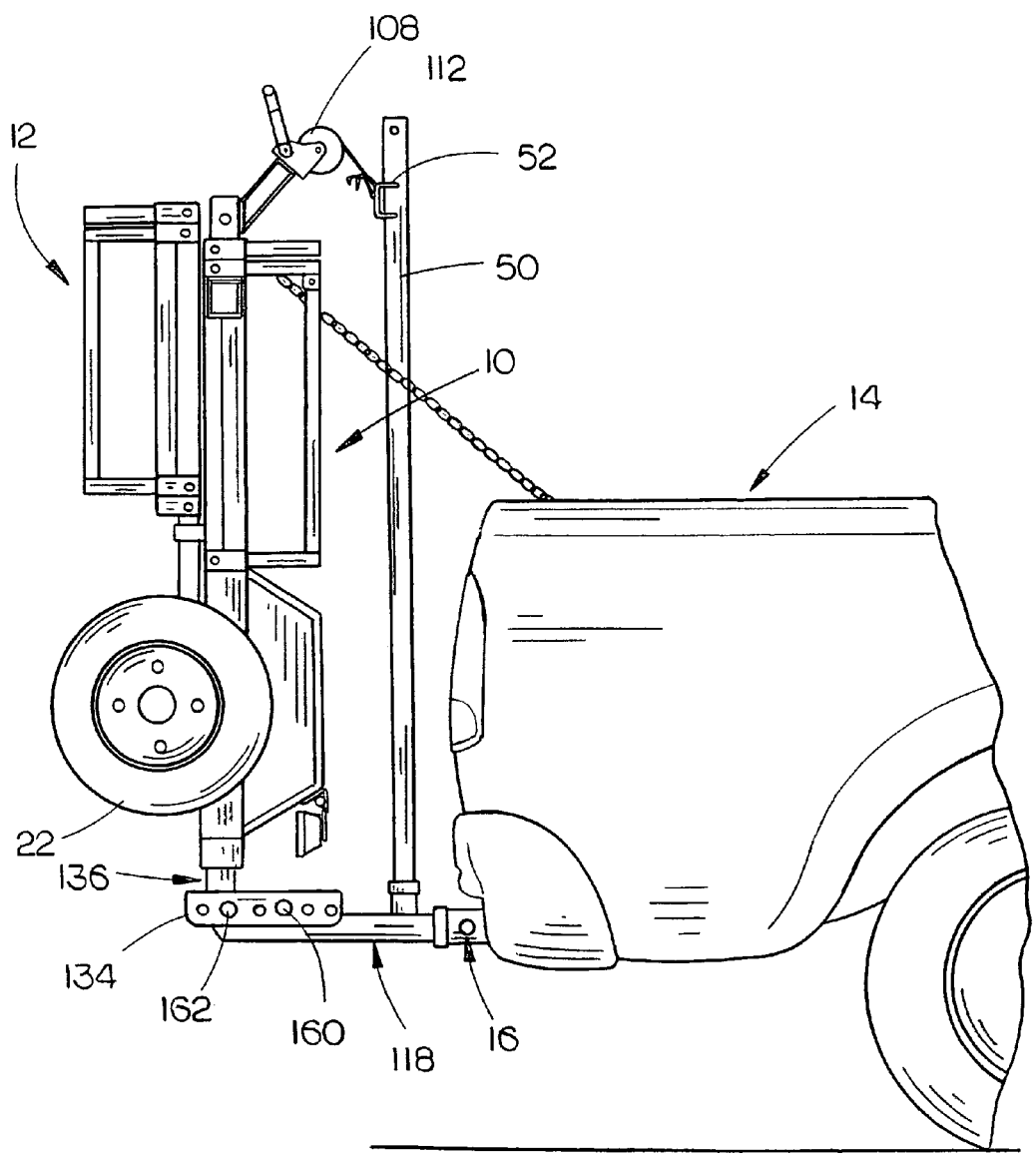
FIG. 8 is a view similar to FIG. 7 except that the trailer and the cargo carrier are shown in their transport positions.
Figure 9:
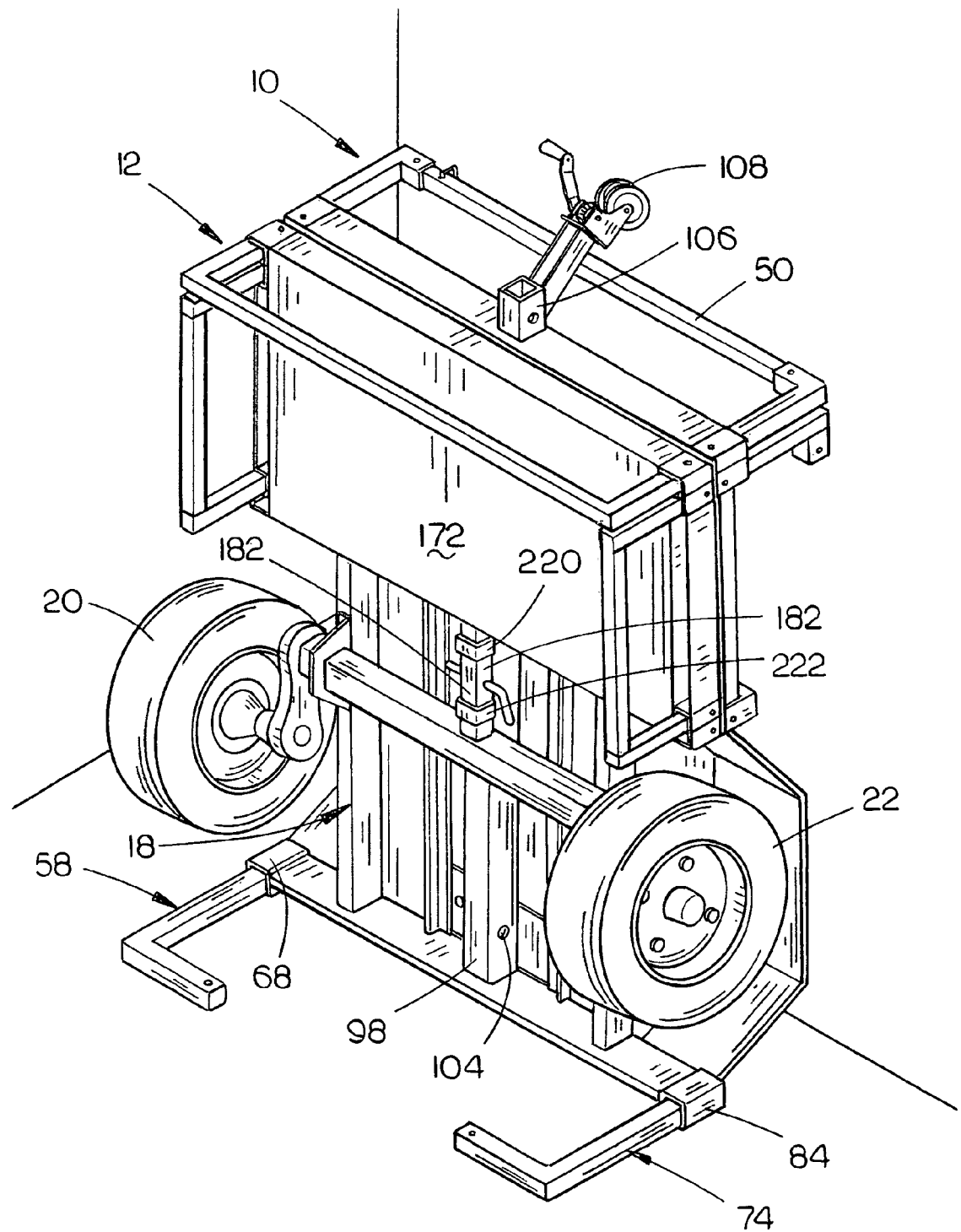
FIG. 9 is a perspective view illustrating the trailer and cargo carrier being stored in a garage or the like in a vertically disposed position with stands being used to stabilize the trailer and cargo carrier in a vertically disposed position.

When it is desired to store the trailer 10 in a garage or the like, the trailer is positioned in the same position as illustrated in FIG. 7 except that the trailer is not secured to a vehicle. The members 58 and 74 are inserted through the pockets 68 and 84 respectively which maintains the trailer in its vertically disposed position adjacent a wall or the like so as to occupy very little space as seen in FIG. 9.

Thus it can be seen that the invention accomplishes all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination with a vehicle having a forward end, a rearward end and a longitudinally extending first box receiver at the rearward end thereof which has an open rearward end, comprising:
a trailer including a frame means having a forward end and a rearward end with a bed positioned thereon and a transversely extending axle secured to the said frame means with first and second wheels secured thereto;
said trailer bed including a forward end, a rearward end, a first side and a second side;
a second longitudinally extending box receiver secured to said frame means of said trailer at said forward end thereof with an open forward end;
a third longitudinally extending box receiver secured to said trailer at said rearward end thereof which has an open rearward end;
a first elongated hitch bar having forward and rearward ends;
said rearward end of said first hitch bar being selectively removably received by said second box receiver;
a coupler selectively removably secured to said forward end of said first hitch bar adapted to be secured to a ball hitch secured to the first box receiver of the vehicle to enable the vehicle to tow said trailer;
a cargo carrier including a bed having a forward end, a rearward end, a first side and a second side;
said cargo carrier having a longitudinally extending second hitch bar secured thereto at its said forward end which may be selectively removably received by the first box receiver of the vehicle when the trailer is disconnected from the vehicle or selectively removably received by said third box receiver, when said trailer is connected to the vehicle, so that said bed of said cargo carrier forms a rearwardly extending extension of said trailer bed to increase the carrying capacity of said trailer.

2. The combination of claim 1 wherein said trailer bed includes a selectively removable upstanding rack at each of its said forward end, said rearward end, said first side and said second side.

3. The combination of claim 1 wherein said cargo carrier bed includes a selectively removably upstanding rack at each of its said forward end, said rearward end, said first side and said second side.

4. The combination of claim 1 wherein a winch means including a winch cable is secured to said trailer at said forward end thereof.

5. The combination of claim 1 wherein a third hitch bar is provided for selective positioned between said first hitch bar and said coupler, said third hitch bar including a first longitudinally extending portion having a channel member secured thereto which extends transversely therefrom, said coupler being selectively vertically secured to said channel member, said first portion of said third hitch bar being selectively removably secured to said forward end of said first elongated hitch bar.

6. The combination of claim 5 wherein said first portion of said third hitch bar also being selectively removably received by said third box receiver.

7. The combination of claim 1 wherein said rearward end of said first elongated hitch bar may be selectively removably secured to the first box receiver.

8. The combination of claim 7 wherein said channel member of said third hitch bar may be pivotally secured to said first elongated hitch bar when said first portion of said third hitch bar is selectively removably received by said third box receiver of said trailer to enable said trailer to be positioned in a generally vertically disposed position at the rearward end of the vehicle for transport.

9. The combination of claim 8 wherein said cargo carrier may be selectively secured to said trailer when said trailer is in its vertically disposed transport position.

10. The combination of claim 8 wherein said first elongated hitch bar has an upstanding pocket secured thereto and wherein the lower end of an upstanding post is selectively removably received in said pocket and wherein a winch means including a winch cable is secured to said trailer at said forward end thereof and wherein said winch cable may be selectively secured to said upstanding post to enable said winch means to move said trailer to its said generally vertically disposed position at the rearward end of the vehicle.

11. In combination with a vehicle having a forward end, a rearward end and a longitudinally extending first box receiver at the rearward end thereof which has an open rearward end, comprising:
 a trailer including a frame means having a forward end and a rearward end with a bed positioned thereon and a transversely extending axle secured to the said frame means with first and second wheels secured thereto;
 said trailer bed including a forward end, a rearward end, a first side and a second side;
 said trailer including hitch means at its said forward end for connection to the vehicle hitch;
 a second longitudinally extending box receiver secured to said frame means of said trailer at said rearward end thereof with an open rearward end;
 a cargo carrier including a bed having a forward end, a rearward end, a first side and a second side;
 said cargo carrier having a longitudinally extending hitch bar secured thereto at its said forward end which may be selectively removably received by the first box receiver of the vehicle when the trailer is disconnected from the vehicle or selectively removably received by said second box receiver, when said trailer is connected to the vehicle, so that said bed of said cargo carrier forms a rearwardly extending extension of said trailer bed to increase the carrying capacity of said trailer.

12. The combination of claim 11 wherein said trailer bed includes a selectively removable upstanding rack at its said rearward end.

13. The combination of claim 1 wherein said cargo carrier bed includes a selectively removably upstanding rack at each of its said forward and rearward ends.

14. The combination of claim 11 wherein a winch means including a winch cable is secured to said trailer at said forward end thereof.

15. The combination of claim 11 further including means for stowing said trailer in a vertically disposed position at the rearward end of the vehicle.

16. The combination of claim 15 further including structure on said trailer to enable said cargo carrier to be mounted on said trailer when said trailer is in its said vertically disposed position.

\* \* \* \* \*